United States Patent
Konishi et al.

(10) Patent No.: US 7,180,697 B2
(45) Date of Patent: Feb. 20, 2007

(54) TAPE LOADING APPARATUS

(75) Inventors: Akio Konishi, Hyogo (JP); Koichiro Hirabayashi, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 328 days.

(21) Appl. No.: 10/188,019

(22) Filed: Jul. 1, 2002

(65) Prior Publication Data

US 2003/0007282 A1    Jan. 9, 2003

(30) Foreign Application Priority Data

Jul. 9, 2001    (JP) ............................. 2001-207496

(51) Int. Cl.
  *G11B 15/61* (2006.01)
  *G11B 15/60* (2006.01)
  *G11B 15/665* (2006.01)
(52) U.S. Cl. .................................. 360/85; 360/130.21
(58) Field of Classification Search ................ 360/85, 360/130.21, 130.22, 130.23
See application file for complete search history.

(56) References Cited

U.S. PATENT DOCUMENTS 4,264,937 A * 4/1981 Kabacinski ................. 360/85
5,407,117 A * 4/1995 Yokoo et al. ................ 226/190
5,798,892 A * 8/1998 Kobayashi ............. 360/130.22
6,141,184 A * 10/2000 Daly ...................... 360/130.21
6,282,057 B1 * 8/2001 Konishi et al. ......... 360/130.23
2001/0012179 A1 * 8/2001 Weisser ................. 360/130.21

FOREIGN PATENT DOCUMENTS

| JP | 62259253 A | * | 11/1987 |
| JP | 62273645 A | * | 11/1987 |
| JP | 63100658 A | * | 5/1988 |
| JP | 63103462 A | * | 5/1988 |
| JP | 63113855 A | * | 5/1988 |
| JP | 01204258 A | * | 8/1989 |
| JP | 01204259 A | * | 8/1989 |
| JP | 05028597 A | * | 2/1993 |
| JP | 06044730 A | * | 2/1994 |
| JP | 07312001 A | * | 11/1995 |
| JP | 11195260 A | * | 7/1999 |
| JP | 2000090519 A | * | 3/2000 |

* cited by examiner

*Primary Examiner*—William J KKlimowicz
(74) *Attorney, Agent, or Firm*—Renner, Otto, Boisselle & Sklar, LLP

(57) ABSTRACT

A tape loading apparatus comprises a base, a tape guide post about which a tape is wrapped for tape loading, and a post end contact member provided on the base for fixing the height of the tape guide post by contacting and pressing an end surface of the tape guide post.

9 Claims, 7 Drawing Sheets

TAPE LOADING APPARATUS

BACKGROUND OF THE INVENTION

1. Field of the Invention

The present invention relates to a tape loading apparatus for use in a magnetic recording/reproduction apparatus, such as a video tape recorder (VTR).

2. Description of the Related Art

Recently, recording density has increased as magnetic recording/reproduction apparatuses, such as VTRs, etc., have become digital and miniaturized. As a result, there is a demand for an improved precision tape running system. Of course, a high degree of precision is required for a tape loading apparatus. For audiovisual products, there is a trend toward reduced size and cost. The same is true of magnetic recording/reproduction apparatuses, such as VTRs, etc.

A conventional tape loading apparatus will be described below. For example, Japanese Patent No. 2701575 discloses a conventional tape loading apparatus. FIGS. 5, 6 and 7A through 7D illustrate this conventional tape loading apparatus for use in a VTR. These figures are based on FIGS. 3, 4, 5 and 15 of Japanese Patent No. 2701575. FIGS. 8 and 9 illustrates a tape guide post mechanism for a conventional tape loading apparatus, such figures being based on FIGS. 4 and 5 of Japanese Patent No. 2789838, respectively. For sake of simplicity, the "boat reference surface" and "reference surface" referred to in Japanese Patent No. 2701575 with respect to FIG. 15, are referred to differently herein as the "boat-side reference surface" and "base-side reference surface" in relation to FIG. 7.

In FIG. 5, reference numeral 52 indicates a cassette, 63 indicates a magnetic tape, and 69 indicates a rotary head cylinder. Reference numeral 58 indicates a feed side loading roller post serving as a tape guide post, which guides the running of the magnetic tape 63. Reference numeral 64 indicates a feed side boat serving as a carrier which carries the feed side loading roller post 58 and an inclined post 66, and draws the magnetic tape 63 present within the cassette 52. Other than these tape guide posts, a plurality of tape guide posts (representing a tape guide post group), such as a tension post 59, take-up side loading posts 60 and 61, and an auxiliary guide post 73 are also used to withdraw the magnetic tape 63 present within the cassette 52. Therefore, a predetermined tape running system is established, so that sound or visual images can be recorded to or reproduced from the magnetic tape 63.

Referring to FIGS. 5 and 6, the magnetic tape 63 withdrawn out of the feed side reel 53 is wrapped about the feed side loading roller post 58 via tape guide posts 59, 76 and 66. Thereafter, the magnetic tape 63 is wrapped about the rotary head cylinder 69, and then about the take-up side loading post 60. The magnetic tape 63 reaches a take-up side reel 64 via a predetermined tape running system. FIG. 6 is a perspective view showing only parts which are associated with the tape running system in the state shown in FIG. 5.

Referring to FIGS. 7A to 7D, reference numeral 51 indicates a chassis as a base, 86 indicates a stopper, 53 indicates a drive shaft. Three boat-side reference surfaces are provided on the rear side of the feed side boat 64. FIGS. 8 and 9 are diagrams showing the mechanism of the tape guide posts and their vicinity of the conventional tape loading apparatus. The arrangement shown in FIGS. 8 and 9 is a typical mechanism of adjusting the height of conventional tape guide posts.

In FIGS. 8 and 9, reference numeral 65 indicates a take-up side boat serving as a carrier, 68 indicates a pipe having an internal thread portion 68a and cylinder portion 68b, which is press-fit onto the take-up side boat 65. Reference numeral 60 indicates a take-up side loading post comprising a roller 60a, a shaft 66, a roller holding member 67, and an upper flange 60b. The roller holding member 67 and the upper flange 60b are press-fit onto the shaft 66. The roller 60a is rotatably supported at an upper portion 66a of the shaft 66 while the upper limit of the position of the roller 60a is defined by the upper flange 60b and the lower limit of the position of the roller 60a is defined by the roller holding member 67. The upper flange 60b and the roller holding member 67 also keep the running of the magnetic tape within the upper and lower limits. The roller holding member 67 has an external thread portion 67a, which engages the internal thread portion 68a of the pipe 68. Reference numeral 80 is a screw which engages an internal thread portion provided in a screw hole 81 of the pipe 68. The tip of the screw 80 presses the circumferential surface of a lower portion 66b of the shaft 66. A hexagonal hollow or slot portion is provided on the top portion of the upper flange 60b, which is engaged with a tool, such as a driver etc., to rotate the upper flange 60b. The rotation of the upper flange 60b causes the shaft 66 and the roller holding member 67 to rotate together.

It should be noted that although the upper flange 60b, the roller 60a, the external thread portion 67a, the internal thread portion 68a, the cylinder portion 68b, the upper portion 66a, and the lower portion 66b are not designated in FIG. 5 of Japanese Patent No. 2789838, these names are added in FIG. 9 for the sake of clarification and convenience. Japanese Patent No. 2701575 does not describe the mechanism of adjusting the height of a tape guide post in the loading mechanism. In fact, the height adjusting mechanism as shown in FIG. 5 of Japanese Patent No. 2789838 is generally incorporated into the loading mechanism. Hereinafter, it is assumed that the height adjusting mechanism as shown in FIG. 5 of Japanese Patent No. 2789838 is incorporated into the loading mechanism of Japanese Patent No. 2701575.

The operation of the thus-constructed conventional tape loading apparatus will be described. The feed side boat 64 is in a state shown in FIG. 7A and 7B when the loading operation has been completed. Specifically, the drive shaft 53 biases the feed side boat 64 to the left. This biasing force causes the feed side boat 64 to contact and press the stopper 86. The feed side boat 64 experiences a reaction force from the stopper 86 in a direction indicated by arrow F (FIG. 7D). As a result, the three boat-side reference surfaces on the rear side of the feed side boat 64 are caused to press the base-side reference surface of the chassis 51, so that the feed side boat 64 is tightly fitted with the base-side reference surface. Therefore, the height of the feed side boat 64 is determined with a high degree of precision only after the feed side boat 64 is in such a state. In this case, the inclination of the feed side boat 64 is also determined with a high degree of precision. As a result, the height and inclination of the feed side loading roller post 58 (tape guide post) carried by the feed side boat 64 are determined with a high degree of precision.

For the current VTR, the width of a track recorded in a magnetic tape is 5 to 20 μm. Therefore, a magnetic tape wrapped about a rotary head cylinder requires a precision of 1 to 2 μm with respect to their relative positions. Therefore, the height precision and inclination of a tape guide post placed near the rotary head cylinder are very important. Specifically, referring to FIG. 6, the precision of the position and inclination of the feed side loading roller post 58 and the take-up side loading roller post 60 is particularly important. The height and inclination of these tape guide posts require a precision of several μm and about 0.2° to 0.5°, respectively. In the future, a higher degree of precision is required as recording density is increased. Needless to say, the greater the height and inclination precisions, the better the quality.

In FIGS. 7A to 7D, variations in the height of the base-side reference surfaces and the height of the feed side loading roller post 58 with respect to the feed side boat 64 are about 10 to 50 μm. Therefore, it is difficult to guarantee a height precision of several μm by simply assembling parts. To avoid this difficulty, in the arrangement shown in FIGS. 8 and 9, for example, the height of the tape guide post 60 is adjusted to obtain required precision by rotating the tape guide post 60, with the hollow portion of the upper flange 60b of the tape guide post 60 being engaged and rotated by a driver.

In order to maintain the precision after the height adjustment, there must not be a play in the vertical direction between the external thread portion 67a of the roller holding member 67 and the internal thread portion 68a of the pipe 68 when they are engaged with each other in FIG. 9. The height of the tape guide posts must not be changed due to vibration, repetition of use, aging, etc. In the arrangement shown in FIG. 9, the screw 80 is laterally driven to press the lower portion 66b of the shaft 66 against the internal wall surface of the cylinder portion 68b of the pipe 68, so that the tape guide post 60 is secured to a carrier (in this case, the take-up side boat 65). Therefore, the height of the tape guide post 60 is prevented from being deviated from the adjusted state.

Referring again to FIG. 7B, the precision of the inclination of the tape guide post 58 is the sum of the inclination precision of the base reference surfaces and the inclination precision of the tape guide post 58 with respect to the boat-side reference surfaces. Therefore, in order to ensure the above-described inclination precision of 0.2° to 0.5°, the inclination precision of the base-side reference surface is about 0.1° to 0.3° and the inclination precision of the tape guide post 58 with respect to the boat-side reference surface is about 0.1° to 0.3°, which is a typical specification for this arrangement. Therefore, typically, the cylindricity of the internal wall surface of the cylinder portion 68b (FIG. 9) of the pipe 68 is about 1 to 3 μm, and the inclination precision of the cylinder portion 68b with respect to the boat-side reference surface is about 0.1° to 0.3°.

There are, however, the following problems with the above-described conventional arrangement. Variations in the inclination of a tape guide post with respect to a base is basically the sum of variations of the inclination of a base-side reference surface and variations in the inclination of the tape guide post with respect to the boat reference surface. High precision machining is required for the base reference surface and the cylinder portion of a pipe with respect to the boat reference surface. Such high precision requires the state of the art machining technology, which leads to an increase in cost for parts. The term "machining" as used herein refers to industrial machining, such as cutting, alloy sintering, resin molding, etc.

The supporting portion of the tape guide post 60 (the lower portion 66b of the shaft 66 in the arrangement shown in FIG. 9) needs to be disposed along the internal wall surface of the cylinder portion 68b of the pipe 68 with a high degree of precision. From this reason, the length of the engagement of the pipe 68 and the tape guide post 60 cannot be smaller than a predetermined size. Therefore, a problem arises in miniaturization.

The carriers 64 and 65 must be made of a material capable of being generally machined with a high degree of precision, such as cast metals (e. g. , zinc die-cast or aluminum die-cast) or super engineering plastics (e. g. , PPS, etc. ), leading to problems such as the costs for materials for parts and molding the materials are high.

In the arrangement of FIG. 7, there is substantially no means for adjusting the inclination of the tape guide post 58 after assembly. Parts having insufficient inclination precision are abandoned, resulting in low yield and high cost.

Adequate spacing for the screws on the tape guide post 58 and the carrier side for use in the height adjusting mechanism is required, thereby making it difficult to design a small carrier and tape guide post. As a result, it is difficult to obtain a small mechanism.

The screw on the tape guide post 58 (the external thread portion 67a of the roller holding member 67 in FIG. 9) and the screw on the carrier side (the internal thread portion 68a of the pipe 68) for use in the height adjusting mechanism are difficult to be produced by component rolling due to their shape constraints. Therefore, such screws have to be shaped by thread cutting, leading to an increase in cost.

It is impossible to manufacture a tape guide post such that the lower portion of the tape guide post supported by a carrier is perfectly in parallel to the tape guide portion of the tape guide post. Specifically, in FIG. 9, the lower portion 66b and the upper portion 66a of the shaft 66 are not perfectly in a straight line. Therefore, the roller 60a supported by the upper portion 66a cannot be manufactured to be perfectly in parallel to the lower portion 66b. Therefore, when a tape guide post is rotated in adjusting the height of the tape guide post, such a slight angle difference causes the tape guide portion to be precessed with respect to the carrier. Therefore, the height adjustment changes the inclination of the tape guide portion with respect to the base, thereby reducing the inclination precision of the tape guide post.

A lateral screw is required for removing play between a tape guide post and a carrier (screw 80 in FIG. 9). Therefore, the number of parts is increased, tapping is required, tightening a screw is required, the number of steps is thus increased, etc. , thereby increasing cost.

The height of a tape guidepost is adjusted by rotating the tape guide post. Therefore, a hollow portion with which a driver or the like is engaged to rotate the tape guide post is generally provided at the upper flange portion thereof. Thus, a slot or hexagonal hollow portion is provided at the upper flange portion, thereby increasing cost (in FIG. 9, no hollow portion is shown at the upper flange portion, but a hollow portion is generally provided at the upper flange portion so as to rotate the tape guide post).

The carrier and the tape guide post are not perfectly rigid bodies. Even if there is no play in the engagement between the carrier and the tape guide post, the tension of a magnetic tape causes slight elastic deformation of the carrier and the tape guide post. Therefore, fluctuation of tape tension slightly modifies the inclination and height of a tape guide post, whereby the inclination and height of the tape guide post become unstable.

When a carrier is made of zinc die-cast or resin which is easy to shape, the carrier is slightly deformed over time, particularly under high temperature. In this case, the inclination and height of a tape guide post is slightly changed, thereby reducing the inclination and height precisions of the tape guide post. A thicker carrier is required in order to minimize such variations, but the larger size inhibits miniaturization.

SUMMARY OF THE INVENTION

According to one aspect of the present invention, a tape loading apparatus comprises a base, a tape guide post about which a tape is wrapped for tape loading, and a post end contact member provided on the base for fixing the height of the tape guide post by contacting and pressing an end surface of the tape guide post. The position in a height direction of the end surface of the tape guide post is directly fixed by the post end contact portion, so that the height of the tape guide post is fixed. The height precision of the tape guide post with respect to a carrier is independent of the height precision of the tape guidepost. Accordingly, there is no longer need for a base-side reference surface for determining the height of the carrier. Further, the base-side reference surface need not be machined with precision with respect to the height thereof, thereby making it possible to reduce cost. Furthermore, it is possible to remove a factor which causes variations in the height of the tape guide post with respect to the carrier, thereby improving the height precision of the tape guide post. The height precision of the tape guide post with respect to the carrier can be greatly relaxed, thereby making it possible to reduce cost. Even if the height of the tape guide post with respect to the carrier is slightly changed due to aging, tape tension, etc., the height of the tape guide post is not changed, i.e., the height of the tape guide post is stable. The slight changes in the height and inclination of the tape guide post with respect to the carrier due to aging, tape tension, etc. can be tolerated, whereby the carrier may not be made of an expensive material and therefore cost can be reduced.

In one embodiment of this invention, the tape loading apparatus further comprises a post height adjusting member for shifting and adjusting the post end contact member upward and downward to fix the height of the tape guide post. By shifting the post end contact member upward or downward, the height of the tape guide post can approach a predetermined height with a high degree of precision. Further, there is no need for adjusting the height of the tape guide post with respect to the carrier, whereby a height adjusting mechanism or a lateral screw is not required on the carrier side. As a result, the carrier and the tape guide post can be miniaturized and their costs can be reduced. The tape guide post is not rotated in the height adjustment, whereby precession does not occur and the inclination of the tape guide post is not changed. Further, the tape guide post is not rotated in the height adjustment, whereby a hollow portion with which a driver is engaged with an upper flange portion is not required and therefore cost can be reduced.

In one embodiment of this invention, the tape loading apparatus further comprises a first post engagement member for fixing the position in the plane of the tape guide post by being engaged with an end of the tape guide post. The first post engagement member is continuously integrated with the post end contact member, and comprises a first internal thread portion provided on the first post engagement member, a first hole provided in the post end contact member, and a post height adjusting screw passed through and engaged with the first hole to interlock with the first internal thread portion. As a result, the height of the tape guide post can be adjusted with great precision by the above-described simple structure, i.e., the formation of the holes and the internal thread portion and the addition of the post height adjusting screw. Therefore, low cost and miniaturization can be realized. Further, since the first post engagement member is continuously integrated with the post end contact member, the number of parts is not increased, the structure is simple, and low cost and miniaturization can be realized.

In one embodiment of this invention, the first post engagement member is provided with a V-shaped cut, and the cut is engaged with the end of the tape guide post. With the V-shaped cut, the position of the portion of the tape guide post can be determined with a higher degree of precision. Therefore, the reproducibility of the inclination of the tape guide post is excellent, whereby the inclination precision of the tape guide post can be further improved.

In one embodiment of this invention, the tape loading apparatus further comprises a first post engagement member for fixing the position in the plane of the tape guide post by being engaged with an end of the tape guide post, a second post engagement member for fixing the position in the plane of the other end of the tape guide post by being engaged with the other end of the tape guide post, and a post inclination adjusting member for adjusting the inclination of the tape guide post by shifting and adjusting the second post engagement member in the plane.

In one embodiment of this invention, the tape loading apparatus further comprises a second internal thread portion integrated with the base, a second hole provided in the second post engagement member, and a post inclination adjusting screw passed through and engaged with the second hole to interlock with the second internal thread portion. The first and second post engagement members and the post end contact member are formed by a single integral structure, and the single integral structure is provided on the base.

In one embodiment of this invention, the first post engagement member is provided with a V-shaped cut, and the cut is engaged with the end of the tape guide post.

In one embodiment of this invention, the tape guide post includes a rotation shaft and a roller rotating about the rotation shaft, and each of the first and second post engagement members is provided with a V-shaped cut. The V-shaped cuts directly contact and press respective ends of the rotation shaft.

In one embodiment of this invention, the post end contact member and the first and second post engagement members are integrated together using sheet metal. The post end contact member is continuously integrated with the first post engagement member via a curved portion of the sheet metal so that the post end contact member faces the first post engagement member and the post end contact member has elasticity to the first post engagement member. The curved portion is provided with a cut, and the V-shaped cut of the first post engagement member is continuous to the cut of the curved portion. A linkage portion is provided so that the linkage portion is substantially perpendicular and continuous to the first and second post engagement members, the first and second post engagement members are substantially parallel to each other, and the linkage portion has elasticity to the first and second post engagement members. The V-shaped cut of the second post engagement member is located at a tip portion of the second post engagement member.

As a result, the height of the tape guide post can be adjusted with great precision by the above-described simple structure, i.e., the formation of the holes and the internal thread portion, and the addition of the post height adjusting screw and the post inclination adjusting screw. Therefore, low cost and miniaturization can be realized. Further, since the first post engagement member, the post end contact member, and the second posit engagement member are continuously integrated together, the number of parts is small, the structure is simple, and low cost and miniaturization can be realized.

Thus, the invention described herein makes possible the advantages of providing a tape loading apparatus such that cost can be reduced and miniaturization is easy while the precision which is as well as or better than conventional tape loading apparatuses.

These and other advantages of the present invention will become apparent to those skilled in the art upon reading and understanding the following detailed description with reference to the accompanying figures.

DESCRIPTION OF THE PREFERRED EMBODIMENT

Hereinafter, the present invention will be described by way of an illustrative example with reference to FIGS. 1 to 4 in the accompanying drawings.

EXAMPLE

Figure 1:
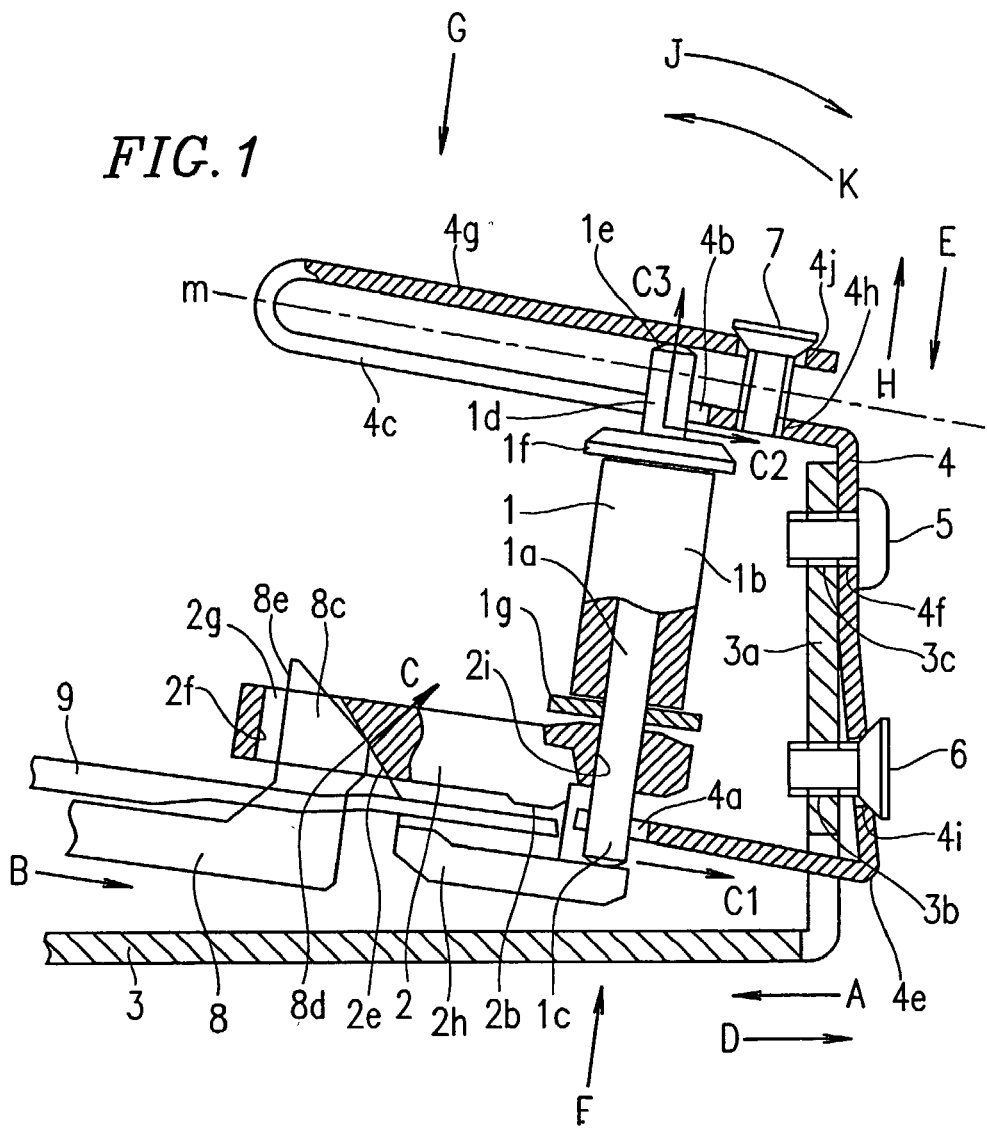
FIG. 1 is a cross-sectional view showing a tape loading apparatus according to an example of the present invention.

FIG. 1 is a diagram showing a tape loading apparatus in relevant part according to an example of the present invention. It should be noted that FIG. 1 shows the tape loading apparatus for use in a magnetic recording/reproduction apparatus, particularly indicating the positioning of tape guide posts in the running of a magnetic tape. The steps from withdrawal of a magnetic tape out of a cassette to formation of a predetermined tape running system, and a function of guiding the magnetic tape are substantially the same as those in conventional technology. Therefore, portions of the tape loading apparatus having substantially the same arrangements or functions as those in conventional apparatuses are not described, and only portions which are characteristically distinguished from conventional apparatuses will be described below.

Referring to FIG. 1, a tape guide post 1 comprises a roller shaft 1a, a roller 1b rotatably supported by the roller shaft 1a, an upper flange 1f fixed on the roller shaft 1a, and a lower flange 1g. The upper limit of the position of the roller 1b is defined by the upper flange 1f, and the lower limit is defined by the lower flange 1g. The upper flange 1f and the lower flange 1g also keep the running of the magnetic tape within the upper and lower limits. A boat 2 works as a carrier for the tape guide post 1. The boat 2 has a hole portion 2g which has internal walls including a sloped portion 2e and a rearwall surface 2f. The boat 2 also has a hole portion 2i. The roller shaft 1a is press-fit into the hole portion 2i. As a result, the tape guide post 1 is carried by the boat 2. A chassis 3 serves as a base and has a vertical wall portion 3a.

Reference numeral 4 indicates a stopper made of sheet metal. The stopper 4 is an integral combination of a post end contact portion 4g as a post end contact member, an upper post guide portion 4c as a first post engagement member, a first post engagement portion 4b, a lower portion 4e as a second post engagement member, and a second post engagement portion 4a, which are each part of a continuum. The stopper 4 has a hole portion 4f. The stopper 4 is secured to the chassis 3 by a screw 5 passing through the hole portion 4f and engaging an internal thread portion 3c provided in the vertical wall portion 3a of the chassis 3. The lower portion 4e of the stopper 4 has a hole portion 4i. An inclination adjusting screw 6 passes through the hole portion 4i, and engages an internal thread portion 3b provided in the vertical wall portion 3a of the chassis 3.

Figure 2:
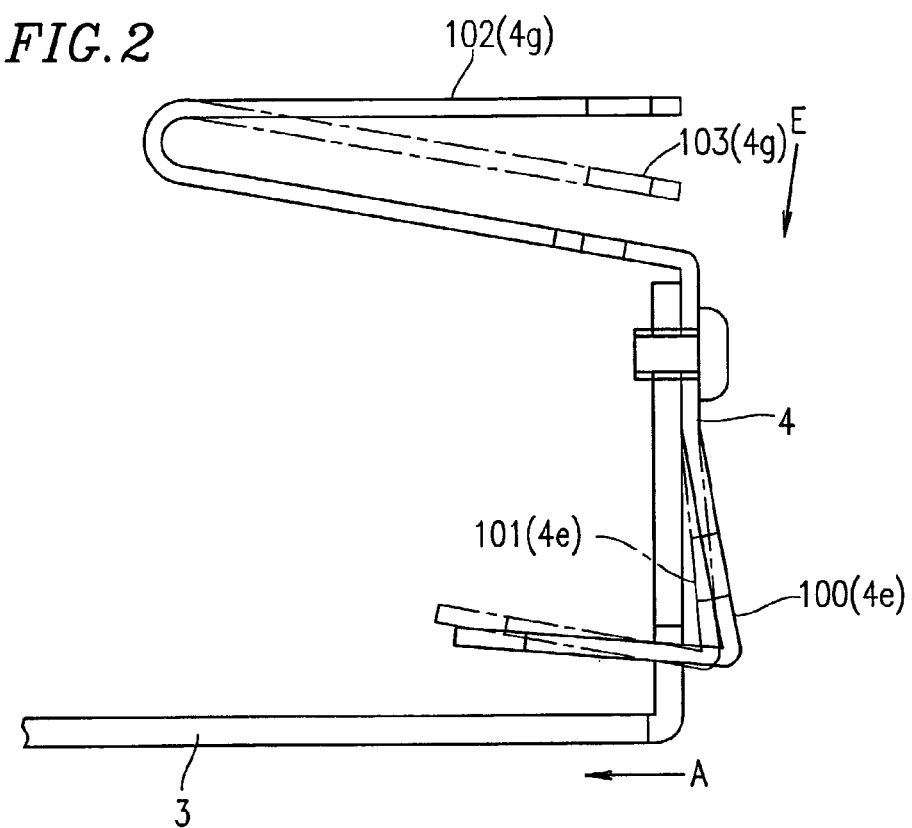
FIG. 2 is a side view showing the state of the stopper 4 before assembly.

FIG. 2 is a diagram showing the state of the stopper 4 before assembly. In FIG. 2, the lower portion 4e has a shape shown by a solid line 100 when it is free from external force. When the inclination adjusting screw 6 is tightened, the lower portion 4e is elastically deformed in a direction indicated by arrow A and is maintained in a state indicated by a dashed line 101. The position of the lower portion 4e indicated by the dashed line 101 is the same as that indicated by the solid line in FIG. 1. Therefore, when the inclination adjusting screw 6 is rotated in a forward direction, the lower portion 4e is further elastically deformed and shifted from the state shown in FIG. 1 in the direction indicated by arrow A. When the inclination adjusting screw 6 is rotated in a backward direction, the elastic deformation of the lower portion 4e is reduced and shifted in a direction indicated by arrow D. Therefore, the position in the plane of the lower portion 4e can be continuously shifted by rotating the inclination adjusting screw 6 in the forward or backward direction.

Figure 3:
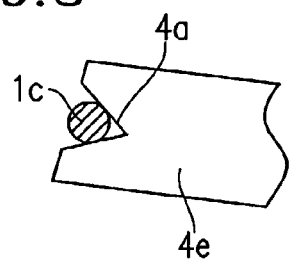
FIG. 3 is a partial view showing a second post engagement portion 4a in the example.

The second post engagement portion 4a is provided at a lower portion of the stopper 4. FIG. 3 is a partial view showing the second post engagement portion 4a, viewed in a direction indicated by arrow F in FIG. 1. As shown in FIG. 3, the second post engagement portion 4a has a V-shaped cut (notch). This notch contacts and is engaged with a lower end portion 1c of the tape guide post 1.

Figure 4:
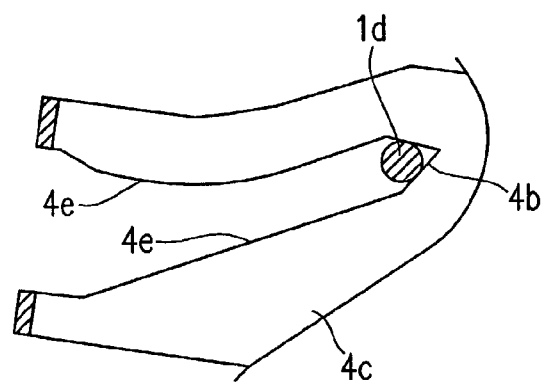
FIG. 4 is a partial view of a upper post guide portion 4c in the example.

FIG. 4 is a partial view of the upper post guide portion 4c, taken along a line indicated by m and viewed in a direction indicated by arrow G in FIG. 1. In FIG. 4, a post tip guide groove portion 4e is provided in the upper post guide portion 4c. A V-shaped first post engagement portion 4b is provided at the end of the post tip guide groove portion 4e. An upper end portion 1d of the tape guide post 1 contacts and is engaged with the V-shaped first post engagement portion 4b.

Referring again to FIG. 1, the post end contact portion 4g has a hole portion 4j at a tip thereof. A height adjusting screw 7 passes through the hole portion 4j and engages an internal thread portion 4h provided in the stopper 4. As shown in FIG. 1, the internal thread portion 4h is provided near a first post engagement portion 4b. An end surface 1e of the tape guide post 1 contacts the post end contact portion 4g.

Referring again to FIG. 2, when the post end contact portion 4g is free from external force, it has a shape indicated by a solid line 102. When the height adjusting screw 7 is tightened, the post end contact portion 4g is elastically deformed in a direction indicated by arrow E, and is maintained in a state indicated by a dashed line 103. The position indicated by the dashed line 103 of the post end contact portion 4g is the same as that indicated by the solid line in FIG. 1. Therefore, when the height adjusting screw 7 is rotated in a forward direction, the post end contact portion 4g is elastically deformed and shifted from the state shown in FIG. 1 in the direction indicated by arrow E. When the height adjusting screw 7 is rotated in a backward direction, the elastic deformation of the post end contact portion 4g is reduced, so that the post end contact portion 4g is shifted in a direction indicated by arrow H. Therefore, the vertical position of the post end contact portion 4g can be continuously and variably shifted by rotating the height adjusting screw 7 in the forward or backward direction.

Referring back to FIG. 1, reference numeral 8 indicates a boat driving member which has a projecting portion 8c which is engaged with the hole portion 2g of the boat 2. The projecting portion 8c has a boat pressing portion 8d at a front portion thereof and a boat pulling portion 8e at a rear portion thereof. Reference numeral 9 indicates a rail fixed on the chassis 3, which is sandwiched by a boat lower side portion 2b of the boat 2 and a boat lower portion 2h to guide the moving path of the boat 2.

The operation of the thus-constructed tape loading apparatus will be described below.

Figure 5:
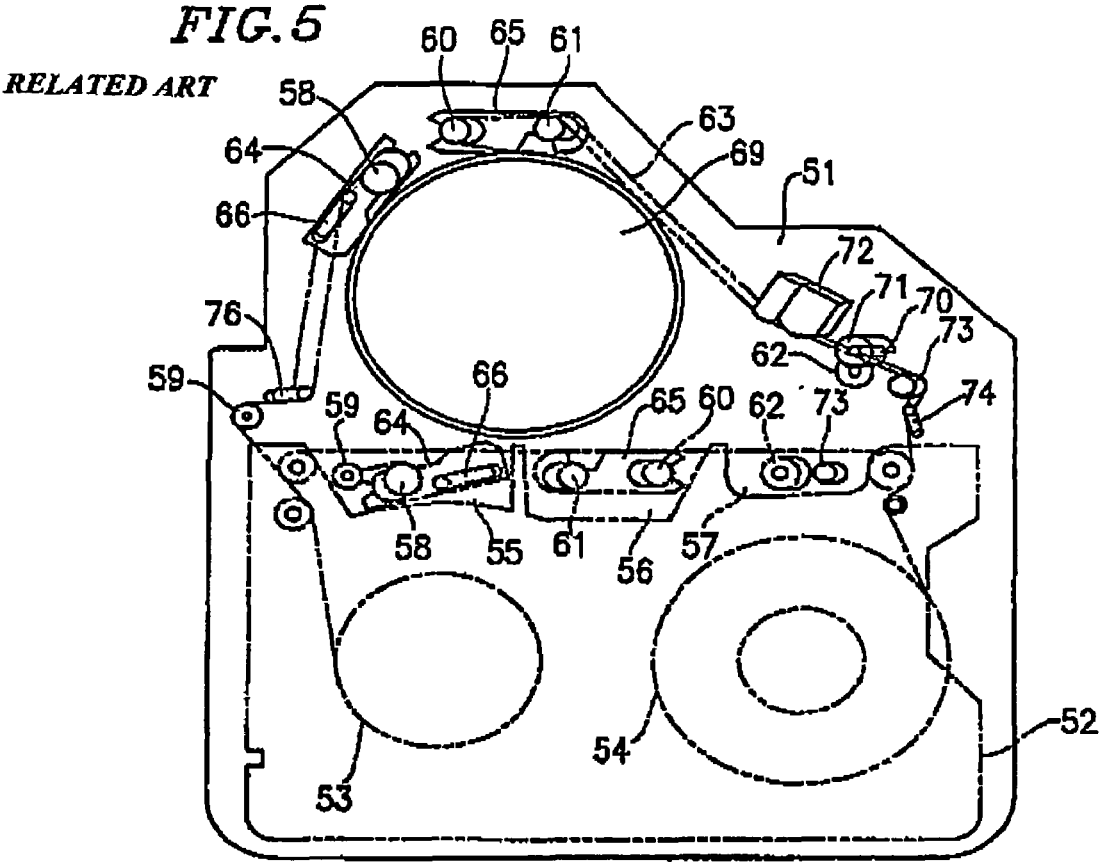
FIG. 5 is a plan view showing a tape loading apparatus for use in a conventional VTR.
Figure 6:
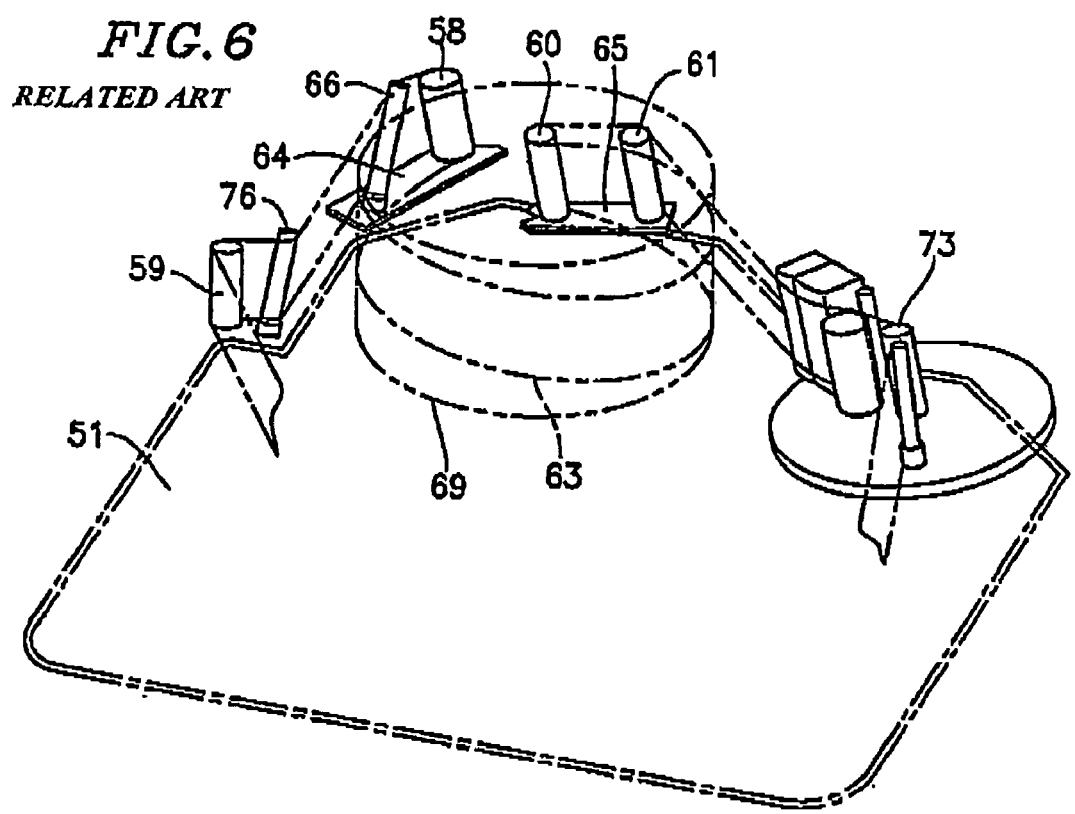
FIG. 6 is a perspective view showing a tape loading apparatus for use in a conventional VTR.
Figure 7A:
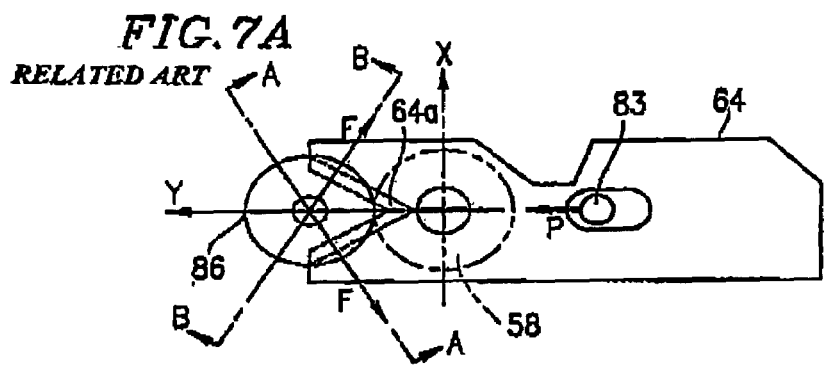
FIGS. 7A to 7D are plan and cross-sectional views showing a tape loading apparatus for use in a conventional VTR.
Figure 7B:
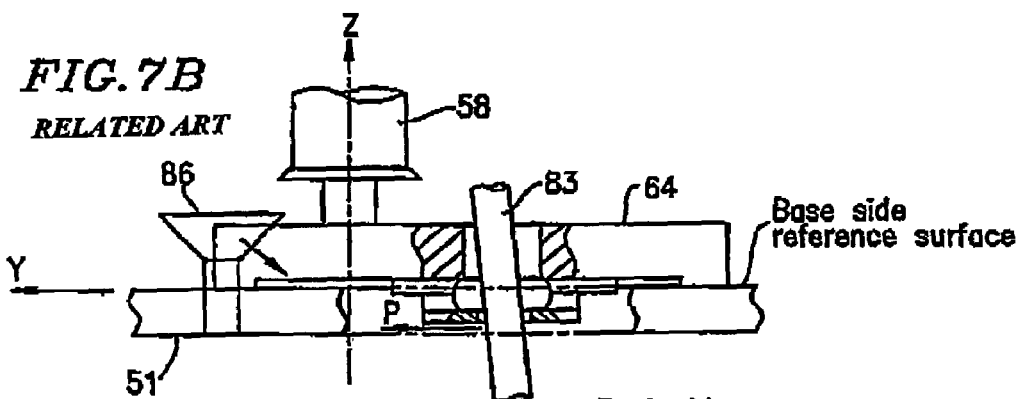
Figure 7C:
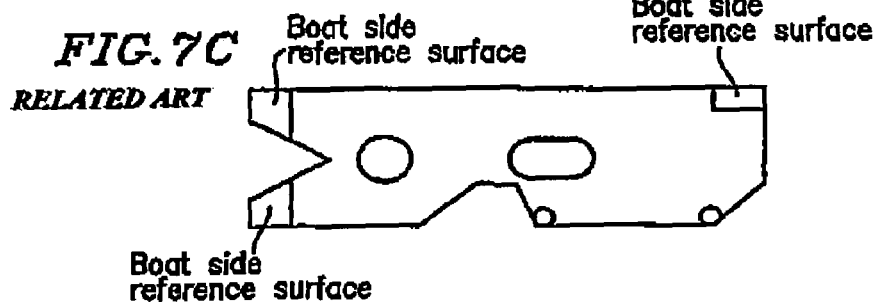
Figure 7D:
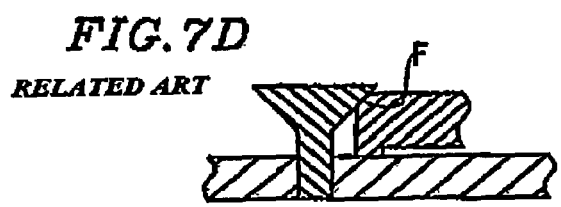
Figure 8:
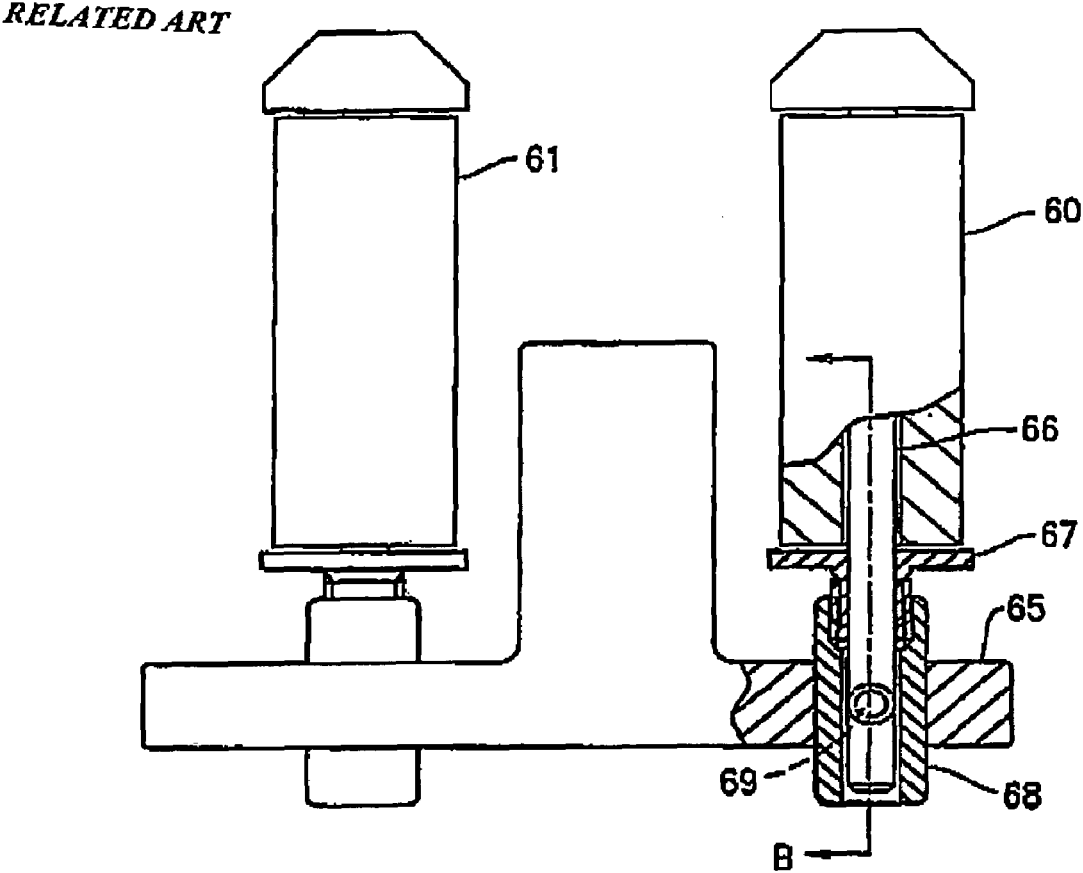
FIG. 8 is an elevation, partially sectional, view showing a tape guide post and surrounding vicinity of a conventional tape loading apparatus.
Figure 9:
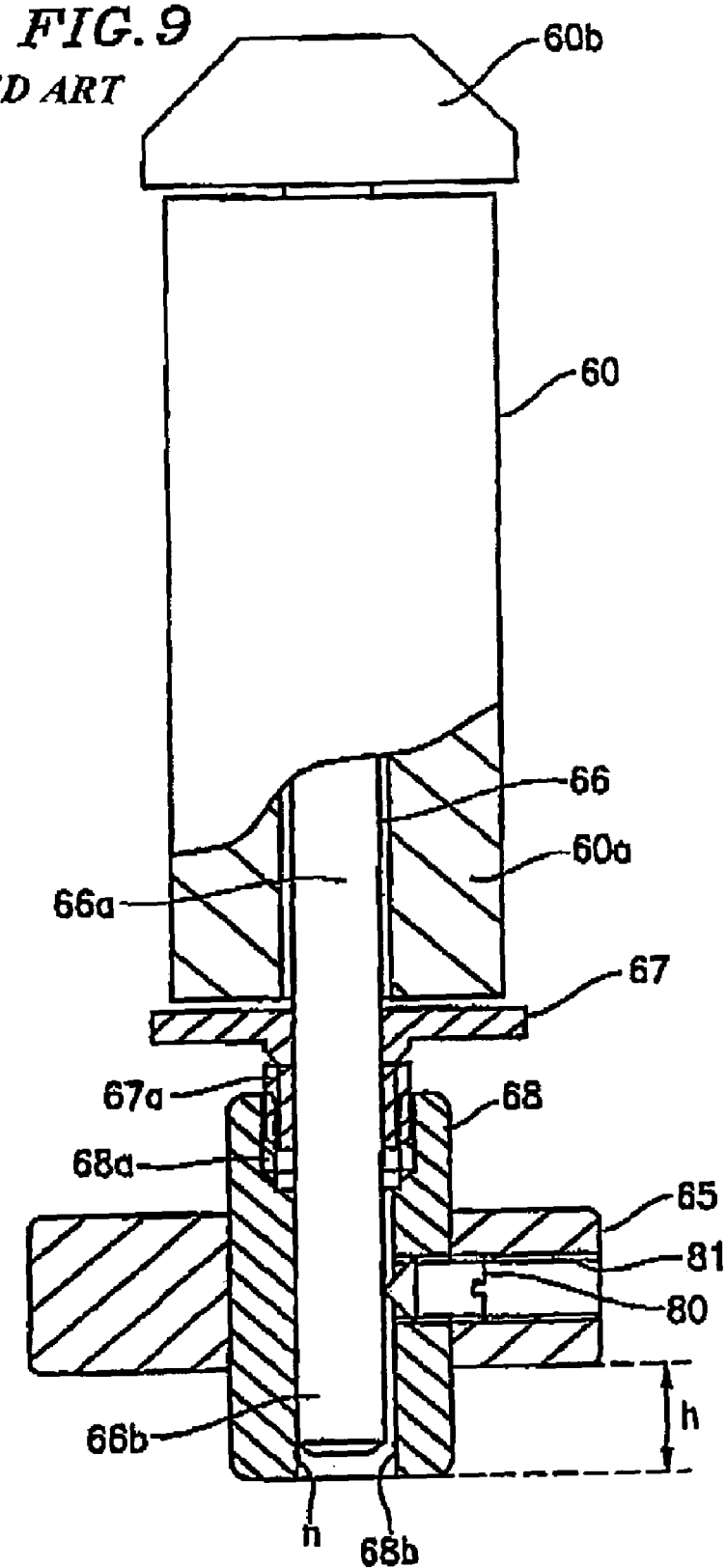
FIG. 9 is an elevation, partially sectional, view showing a tape guide post and surrounding vicinity of a conventional tape loading apparatus.

Initially, the boat 2 is driven by the movement of the boat driving member 8 and the boat 2 is then guided and moved along the rail 9. The tape guide post 1 carried by the boat 2 is moved from a position within a cassette along a predetermined path. As a result, the tape guide post 1 withdraws a magnetic tape from a cassette to form a predetermined tape running system. A series of these operations are the same as the above-described conventional example and therefore are not shown. FIG. 1 shows the tape guide post 1 and surrounding vicinity when the predetermined tape running system has been formed. The tape guide post 1 of FIG. 1 plays the same role as the feed side loading roller post 8 and the take-up side loading roller post 10 of FIG. 5 in the conventional example. The inclination and height of the tape guide post 1 of FIG. 1 also have to be determined with a high degree of precision in order to guide a magnetic tape running around a rotary head cylinder with great precision.

In FIG. 1, the boat driving member 8 is biased in a direction indicated by arrow B (a biasing means is not shown). As a result, a force is exerted on the sloped surface 2e of the boat 2 in a direction indicated by arrow C. The force in the direction indicated by arrow C causes the end surface 1e to be biased in a direction indicated by arrow C3, so that the upper end portion 1d is biased in a direction indicated by arrow C2 and the lower end portion 1c is biased in the direction indicated by arrow C1. By the above-described force, the end surface 1e of the tape guide post 1 contacts and presses the post end contact portion 4g. The force in the direction indicated by arrow C3 causes the end surface 1e to constantly press the post end contact portion 4g, thereby maintaining the height of the tape guide post 1 in a very stable manner.

The above-described force causes the upper end portion 1d to be engaged with the first post engagement portion 4b, and causes the lower end portion 1c to the second post engagement portion 4a. Since the first post engagement portion 4b is in the V shape, the position of the upper end portion 1d is maintained very stable in the plane. Since the second post engagement portion 4a is also in the V shape, the position of the lower end portion 1c is maintained very stable in the plane. Therefore, since both the upper end portion 1d and the lower end portion 1c are maintained very stable in the plane, the inclination of the tape guide post 1 is also maintained very stable. In this case, as shown in FIG. 1, the boat 2 does not contact the chassis 3, the rail 9, etc. and is in a floating position. In other words, after the height and inclination of the tape guide post 1 have been determined, the inclination and height of the boat 2 are determined.

In this situation, when the inclination adjusting screw 6 is rotated in a forward direction, the lower end portion 4e is shifted in the direction indicated by arrow A. The second post engagement portion 4a is also shifted in the direction of arrow A. As a result, the tape guide post 1 is inclined in a direction indicated by arrow J. When the inclination adjusting screw 6 is rotated in a backward direction, the tape guide post 1 is inclined in a direction indicated by arrow K which is opposite to the direction of arrow J. The boat driving member 8 exerts the biasing force in the direction of arrow C1 to the lower end portion 1c of the tape guide post 1, so that the lower end portion 1c of the tape guide post 1 accurately tracks the second post engagement portion 4a moving in the plane. Thus, the forward or backward rotation of the inclination adjusting screw 6 causes the second post engagement portion 4a to move in the plane, thereby making it possible to adjust the inclination of the tape guide post 1 in a continuous and easy manner. Further, the inclination of the tape guide post 1 can be determined to be at a predetermined angle with great precision by fine adjustment of the angle of rotation.

When the height adjusting screw 7 is rotated in a forward direction, the post end contact portion 4g is shifted in the direction of arrow E. The upper end portion 1e of the tape guide post 1 is also pushed in the direction of arrow E. As a result, the tape guide post 1 is also shifted in the direction of arrow E, so that the height of the tape guide post 1 is lowered. When the height adjusting screw 7 is rotated in a backward direction, the tape guide post 1 is shifted and elevated in the direction of arrow H which is opposite to the direction of arrow E. In this case, the boat driving member 8 exerts a biasing force to the upper end portion 1e of the tape guide post 1 in the direction of arrow C3, so that the upper end portion 1e of the tape guide post 1 accurately tracks the upward or downward movement of the post end contact portion 4g. Thus, the forward or backward direction of the height adjusting screw 7 causes the upper end portion 1e to move upward or downward, thereby making it possible to adjust the height of the tape guide post 1 in a continuous and easy manner. Further, the height of the tape guide post 1 can be determined to be at a predetermined height with great precision by fine adjustment of the angle of rotation.

As described above, the tape loading apparatus according to the example of the present invention comprises a base and a tape guide post about which a tape is wrapped. A post end contact member is provided on the base so that the post end contact member contacts and presses the end surface of the tape guide post to fix the height of the tape guide post. Thus, the position in a height direction of the end surface of the tape guide post is directly fixed by the post end contact portion, so that the height of the tape guide post is fixed. The height precision of the tape guide post with respect to a carrier is independent of the height precision of the tape guide post. Accordingly, there is no longer need for a base-side reference surface for determining the height of the carrier. Further, the base-side reference surface need not be machined with precision with respect to the height thereof, thereby making it possible to reduce cost. Furthermore, it is possible to remove a factor which causes variations in the height of the tape guide post with respect to the carrier, thereby improving the height precision of the tape guide post. The height precision of the tape guide post with respect to the carrier can be greatly relaxed, thereby making it possible to reduce cost. Even if the height of the tape guide post with respect to the carrier is slightly changed due to aging, tape tension, etc. , the height of the tape guide post is not changed, i. e. , the height of the tape guide post is stable. The slight changes in the height and inclination of the tape guide post with respect to the carrier due to aging, tape tension, etc. can be tolerated, whereby the carrier may not be made of an expensive material and therefore cost can be reduced.

As described above, the post height adjusting means for shifting upward or downward the post end contact member for fixing the height of the tape guide post is provided. By shifting the post end contact member upward or downward, the height of the tape guide post can approach a predetermined height with a high degree of precision. Further, there is no need for adjusting the height of the tape guide post with respect to the carrier, whereby a height adjusting mechanism or a lateral screw is not required on the carrier side. As a result, the carrier and the tape guide post can be miniaturized and their costs can be reduced. The tape guide post is not rotated in the height adjustment, whereby precession does not occur and the inclination of the tape guide post is not changed. Further, the tape guide post is not rotated in the height adjustment, whereby a hollow portion with which a driver is engaged with an upper flange portion is not required and therefore cost can be reduced.

Further, the tape loading apparatus has the first post engagement member which is engaged with the side of an end of the tape guide post to fix the position in the plane of the tape guide post. The first post engagement member is continuously integrated with the post end contact member. The first internal thread provided in the first post engagement member, the first hole provided in the post end contact member, the post height adjusting screw which is passed through the first hole and is engaged with the first internal thread section, are provided. As a result, the height of the tape guide post can be adjusted with great precision by the above-described simple structure, i. e. , the formation of the holes and the internal thread portion and the addition of the post height adjusting screw. Therefore, low cost and miniaturization can be realized. Further, since the first post engagement member is continuously integrated with the post end contact member, the number of parts is not increased, the structure is simple, and low cost and miniaturization can be realized.

The first post engagement member for fixing the position in the plane of the tape guide post is further provided with a V-shaped cut. An end of the tape guide post is engaged with this cut. With the V-shaped cut, the position of the portion of the tape guide post can be determined with a higher degree of precision. Therefore, the reproducibility of the inclination of the tape guide post is excellent, whereby the inclination precision of the tape guide post can be further improved.

As described above, the tape loading apparatus according to the example of the present invention comprises a base, a tape guide post about which a tape is wrapped, a first post engagement member which is engaged with an end of the tape guide post to fix the position in the plane of the tape guide post, a post end contact member which contacts and presses the end surface of the tape guide post near the first post engagement member to fix the height of the tape guide post, a post height adjusting means for shifting the post end contact member upward or downward to adjust the height of the tape guide post, a second post engagement member which is engaged with the other end of the tape guide post to fix the position in the plane of the tape guide post, and a post inclination adjusting means for shifting the second post engagement member in the plane to adjust the inclination of the tape guide post. The position in the plane of the end of the tape guide post is directly determined by the first post engagement member, while the position in the plane of the other end of the tape guide post is directly determined by the second post engagement member, thereby determining the inclination of the tape guide post. Therefore, the inclination precision of the tape guide post with respect to the carrier is independent of the inclination precision of the tape guide post. The inclination precision of the tape guide post with respect to the carrier can be greatly relaxed, thereby making it possible to reduce cost. There is no need for a base-side reference surface for determining the inclination of the carrier, whereby the high-precision machining of the base-side reference surface is not required and therefore cost can be reduced. Further, a member for supporting the tape guide post may not be positioned with a high degree of precision with respect to an engaging portion on the carrier side (in the above-described conventional example, the internal wall surface of the cylinder portion of the pipe). Therefore, the length of the engagement between the carrier and the tape guide post can be small, leading to miniaturization. By shifting the second post engagement member in the plane, the inclination of the tape guide post can be adjusted to a predetermined angle of inclination with great precision.

Further, the tape loading apparatus has the first internal thread provided in the first post engagement member, the first hole provided in the post end contact member, the post height adjusting screw which is passed through the first hole and is engaged with the first internal thread section, the second internal thread integrated with the base, the second hole provided in the second post engagement member, and the post inclination adjusting screw which is passed through the second hole and is engaged with the second internal thread section. The first post engagement member and the first and second post engagement members are formed by a single integrated structure and the structure is provided on the base. As a result, the height of the tape guide post can be adjusted with great precision by the above-described simple structure, i. e. , the formation of the holes and the internal thread portion, and the addition of the post height adjusting screw and the post inclination adjusting screw. Therefore, low cost and miniaturization can be realized. Further, since the first post engagement member, the post end contact member, and the second post engagement member are continuously integrated together, the number of parts is small, the structure is simple, and low cost and miniaturization can be realized.

It should be noted that in the example, the tape guide post near the rotary head cylinder is explained as an example, but the same is true of tape guide posts in other portions. In the example, the tape guide post having a rotary roller is explained as an example, but the same is true of a tape guide post without a rotary roller.

As described above, the height precision of a tape guide post as well as or better than that of conventional tape guide posts can be secured, cost can be reduced, and miniaturization is easy. Further, the inclination precision of a tape guide post as well as or better than that of conventional tape guide posts can be secured, cost can be reduced, and miniaturization is easy. Thus, the excellent effects can be obtained according to the present invention.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A tape loading apparatus, comprising:
   a base;
   a tape guide post about which a tape is wrapped for tape loading, the tape guide post having one end and a distal end;
   a post engagement member is engaged with the tape guide post at said one end; and
   a post end contact member provided on the base for fixing the height of the tape guide post by contacting and pressing an end surface of the distal end of the tape guide post.

2. A tape loading apparatus according to claim 1, further comprising a post height adjusting member for shifting and adjusting the post end contact member upward and downward to fix the height of the tape guide post.

3. A tape loading apparatus, comprising:
   a base;
   a tape guide post about which a tape is wrapped for tape loading;
   a post end contact member provided on the base for fixing the height of the tape guide post by contacting and pressing an end surface of the tape guide post;
   a post height adjusting member for shifting and adjusting the post end contact member upward and downward to fix the height of the tape guide post; and
   a first post engagement member for fixing the position in the plane of the tape guide post by being engaged with an end of the tape guide post,
   wherein the first post engagement member is continuously integrated with the post end contact member, and comprises a first internal thread portion provided on the first post engagement member, a first hole provided in the post end contact member, and a post height adjusting screw passed through and engaged with the first hole to interlock with the first internal thread portion.

4. A tape loading apparatus according to claim 3, wherein the first post engagement member is provided with a V-shaped cut, and the cut is engaged with the end of the tape guide post.

5. A tape loading apparatus, comprising:
   a base;
   a tape guide post about which a tape is wrapped for tape loading;
   a post end contact member provided on the base for fixing the height of the tape guide post by contacting and pressing an end surface of the tape guide post;
   a post height adjusting member for shifting and adjusting the post end contact member upward and downward to fix the height of the tape guide post;
   a first post engagement member for fixing the position in the plane of the tape guide post by being engaged with an end of the tape guide post;
   a second post engagement member for fixing the position in the plane of the other end of the tape guide post by being engaged with the other end of the tape guide post; and
   a post inclination adjusting member for adjusting the inclination of the tape guide post by shifting and adjusting the second post engagement member in the plane.

6. A tape loading apparatus according to claim 5, further comprising:
   a second internal thread portion integrated with the base;
   a second hole provided in the second post engagement member; and
   a post inclination adjusting screw passed through and engaged with the second hole to interlock with the second internal thread portion,
   wherein the first and second post engagement members and the post end contact member are formed by a single integral structure, and the single integral structure is provided on the base.

7. A tape loading apparatus according to claim 6, wherein the second post engagement member is provided with a V-shaped cut, and the cut is engaged with the other end of the tape guide post.

8. A tape loading apparatus according to claim 6, wherein the tape guide post includes a rotation shaft and a roller rotating about the rotation shaft, and each of the first and second post engagement members is provided with a V-shaped cut, the V-shaped cuts directly contacting and pressing respective ends of the rotation shaft.

9. A tape loading apparatus according to claim 8, wherein the post end contact member and the first and second post engagement members are integrated together using sheet metal,
   the post end contact member is continuously integrated with the first post engagement member via a curved portion of the sheet metal so that the post end contact member faces the first post engagement member and the post end contact member has elasticity to the first post engagement member,
   the curved portion is provided with a cut, and the V-shaped cut of the first post engagement member is continuous to the cut of the curved portion,
   a linkage portion is provided so that the linkage portion is substantially perpendicular and continuous to the first and second post engagement members, the first and second post engagement members are substantially parallel to each other, and the linkage portion has elasticity to the first and second post engagement members, and
   the V-shaped cut of the second post engagement member is located at a tip portion of the second post engagement member.

* * * * *